(12) United States Patent
Coers et al.

(10) Patent No.: US 7,520,115 B2
(45) Date of Patent: Apr. 21, 2009

(54) HEADER FLOAT ARM LOAD COMPENSATION

(75) Inventors: Bruce Alan Coers, Hillsdale, IL (US); Corwin Marcus Puryk, East Moline, IL (US); Benjamin Max Lovett, Colona, IL (US); Gerald Eric Rains, Eldridge, IA (US); Sheldon Joseph Grywacheski, Eldridge, IA (US); Mark Alan Melton, Erie, IL (US)

(73) Assignee: Deere & Company, Moline, IL (US)

( * ) Notice: Subject to any disclaimer, the term of this patent is extended or adjusted under 35 U.S.C. 154(b) by 40 days.

(21) Appl. No.: 11/614,637

(22) Filed: Dec. 21, 2006

(65) Prior Publication Data
US 2008/0078155 A1 Apr. 3, 2008

Related U.S. Application Data

(60) Provisional application No. 60/825,857, filed on Sep. 15, 2006.

(51) Int. Cl.
A01D 34/00 (2006.01)

(52) U.S. Cl. ..................................... 56/15.8

(58) Field of Classification Search .............. 56/15.8, 56/208, 10.4, 181, 179
See application file for complete search history.

(56) References Cited

U.S. PATENT DOCUMENTS

| 3,886,718 | A | * | 6/1975 | Talbot | 56/208 |
| 3,982,383 | A | * | 9/1976 | Mott | 56/11.6 |
| 4,011,709 | A | * | 3/1977 | Mott et al. | 56/10.4 |
| 4,206,583 | A | * | 6/1980 | Week et al. | 56/15.8 |
| 4,206,584 | A | * | 6/1980 | Johnson et al. | 56/15.8 |
| 4,414,793 | A | * | 11/1983 | Halls | 56/14.4 |
| 4,441,307 | A | * | 4/1984 | Enzmann | 56/208 |
| 4,573,308 | A | * | 3/1986 | Ehrecke et al. | 56/14.4 |
| 4,599,852 | A | * | 7/1986 | Kerber et al. | 56/15.8 |
| 4,660,360 | A | * | 4/1987 | Hardesty et al. | 56/208 |
| 4,665,685 | A | * | 5/1987 | Rupprecht | 56/208 |
| 4,776,153 | A | * | 10/1988 | DePauw et al. | 56/10.2 E |
| 5,157,905 | A | * | 10/1992 | Talbot et al. | 56/15.9 |
| 5,464,371 | A | * | 11/1995 | Honey | 460/20 |
| RE35,543 | E | * | 7/1997 | Patterson | 56/14.4 |
| 6,675,568 | B2 | * | 1/2004 | Patterson et al. | 56/208 |
| 2004/0065069 | A1 | * | 4/2004 | Dunn et al. | 56/10.4 |
| 2007/0193243 | A1 | * | 8/2007 | Schmidt et al. | 56/181 |

* cited by examiner

Primary Examiner—Árpád Fábián-Kovács

(57) ABSTRACT

A float arm load compensation system for a header of an agricultural harvester includes a header frame; a plurality of header float arms pivotally coupled to the header frame; a cutter bar fixed to forward ends of the plurality of header float arms; at least one conveyor belt supported on the plurality of header float arms and configured to traverse the header perpendicular to the direction of travel of the header, wherein the conveyor belt is further configured to receive crop material cut by the cutter bar; and a plurality of springs, wherein each spring is coupled to an associated header float arm of the plurality of header float arms to exert a force on the associated header float arm compensating for the weight of cut crop material supported by the associated header float arm.

19 Claims, 5 Drawing Sheets

HEADER FLOAT ARM LOAD COMPENSATION

RELATED APPLICATIONS

This invention claims priority to U.S. Prov. Pat. App. Ser. No. 60/825,857, entitled "Header Float Arm Load Compensation", which was filed on Sep. 15, 2006 by the same inventors.

FIELD OF THE INVENTION

This invention relates generally to harvesters. More particularly, it relates to conveying systems for conveying cut crop material to the harvester vehicle.

BACKGROUND OF THE INVENTION

Harvesters have headers (typically called "Draper platforms") that carry cut crop material on conveyor belts. These conveyor belts extend across the width of the header to a central discharge region of the header. The conveyor belts are supported on rollers that, in turn, are mounted on header float arms that are elongated and extend forwardly. These arms are pivotally mounted to a frame of the header. The forward ends of the header float arms are coupled to and support a cutter bar that extends across the width of the header.

The cutter bar and/or the forward ends of the arms skid across the surface of the ground as the harvester goes through the field harvesting crop. As the harvester is driven through the field, the ground rises and falls underneath the header and the arms pivot up and down responsibly, thereby permitting the cutter bar to follow the contours of the ground more closely.

If the cutter bar and/or the front ends of the arms apply too much pressure to the ground they will dig into the ground and be damaged. Controlling the downforce is therefore important in keeping the header and harvester operating properly.

To reduce the downforce applied by the header to the ground, each arm is partially supported by a hydraulic, pneumatic, or mechanical spring. The springs are coupled to the frame of the header and transmit some of the crop weight to the frame. They do this by exerting a lifting or "up" force on the arms that counteracts the weight of the arms and the additional downforce exerted on the arms by the cut crop material that falls backward onto the conveyor belts after it is cut by the cutter bar. The springs transfer some of the weight of the header float arms and cut crop material to the feeder house on which the header is supported and transfer the weight off the cutter bar and ground.

The cut crop material is not evenly distributed across the width of the header conveyors. The crop is cut by the cutter bar across the entire front of the header and then falls backwards onto the conveyor belts, a left conveyor belt and a right conveyor belt. The left conveyor belt carries the cut crop material from the left side of the header to the center section of the header, and the right conveyor belt carries the cut crop material from the right side of the header to the center section of the header. Once the cut crop material reaches the center section of the header, the left and right conveyors dump the cut crop material into a center conveyor that carries the cut crop material backwards, through the feeder house, and into the self-propelled vehicle portion of the harvester.

Depending upon its position across the front of the header, each header float arm needs a different amount of upward counterbalancing force in order that each header float arm exerts the same downforce against the ground that all the other header float arms do. In the ideal situation, each header float arm provides the same, optimal downforce against the ground.

In order for each header float arm to provide the same downforce against the ground, each spring must apply a different upforce to its associated header float arms. This is necessary since different portions of the conveyor (and hence each header float arm) support different quantities of cut crop material. As the conveyors move laterally across the width of the header toward the lateral midpoint of the header, more and more cut crop material falls onto the conveyor belt. And the header float arms closer to the lateral midpoint of the header carry a greater and greater weight of cut crop material. This additional crop material resting on the header float arms closer to the lateral midpoint or center of the header means that the header float arms closer to the lateral midpoint require a greater counterbalancing upforce—the force exerted by the springs—if each header float arm is to apply a constant downforce against the ground.

What is needed, therefore, is a control system for applying to each header float arm in the header a counterbalancing upforce that is appropriate to support the crop load and to maintain constant the downforce exerted by each header float arm against the ground (either directly, or through the cutter bar). It is an object of this invention to provide such a system.

SUMMARY OF THE INVENTION in accordance with the first aspect of the invention of float arm load compensation system for a header of an agricultural harvester is provided, comprising a header frame; a plurality of header float arms pivotally coupled to the header frame; a cutter bar fixed to forward ends of the plurality of header float arms; at least one conveyor belt supported on the plurality of header float arms and configured to traverse the header perpendicular to the direction of travel of the header, wherein the conveyor belt is further configured to receive crop material cut by the cutter bar; and a plurality of springs, wherein each spring is coupled to an associated header float arm of the plurality of header float arms to exert a force on the associated header float arm compensating for the weight of cut crop material supported by the associated header float arm.

The springs of the plurality of springs that support float arms closer to the lateral midpoint of the header may be configured to exert a greater upforce on their associated header float arms than other springs of the plurality of springs that support float arms farther from the lateral midpoint of the header. The plurality of springs may be configured to maintain constant the downforce exerted by their associated header float arms against the ground across a width of the header. The load compensation system may further include a control circuit configured to monitor an operational parameter of the agricultural harvester indicative of the load on the at least one conveyor belt. The control circuit may monitor an operational parameter indicative of a load on the rotor of the harvester. The control circuit may be configured to automatically change the forces exerted by the plurality of springs on their associated header float arms in response to changes in the operational parameter. The load compensation system may further include an accumulator containing gas charged hydraulic fluid coupled to the plurality of springs. The load compensation system may further include a valve configured to simultaneously change the force is applied by the plurality of springs by filling and emptying the accumulator. The load compensation system may further include at least first and second accumulators containing hydraulic fluid under pressure, wherein the first accumulator is coupled to a first group of springs of the plurality of springs, and wherein the second accumulator is coupled to a second group of springs of the plurality of springs. The plurality of springs may be mechanical springs. The mechanical springs may be coil springs.

DESCRIPTION OF THE PREFERRED EMBODIMENTS

An "upforce", as that term is used herein, refers to a force applied to a header float arm that tends to lift the forward end of the header float arm upward and away from the ground thereby reducing the force of the header float arm against the ground. It does not imply or require that the force itself be directed upward at its point of application to the header float arm. Indeed, depending upon the geometry of the header float arm, the force may be applied to the header float arm in any direction and at any point along the arm.

Figure 1:
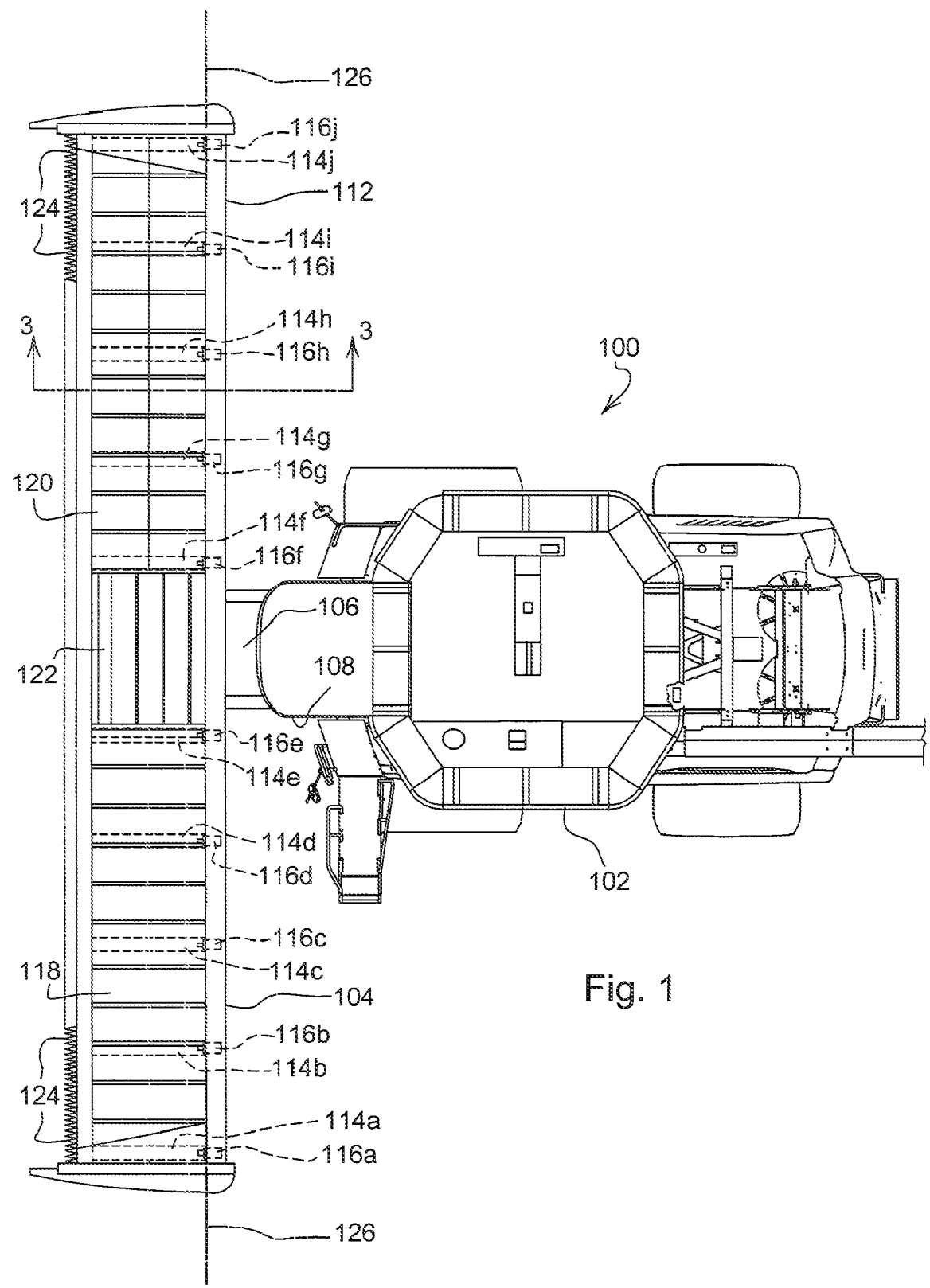
FIG. 1 is a plan view of a harvester having a header in the form of a Draper platform in accordance with the present invention.
Figure 2:
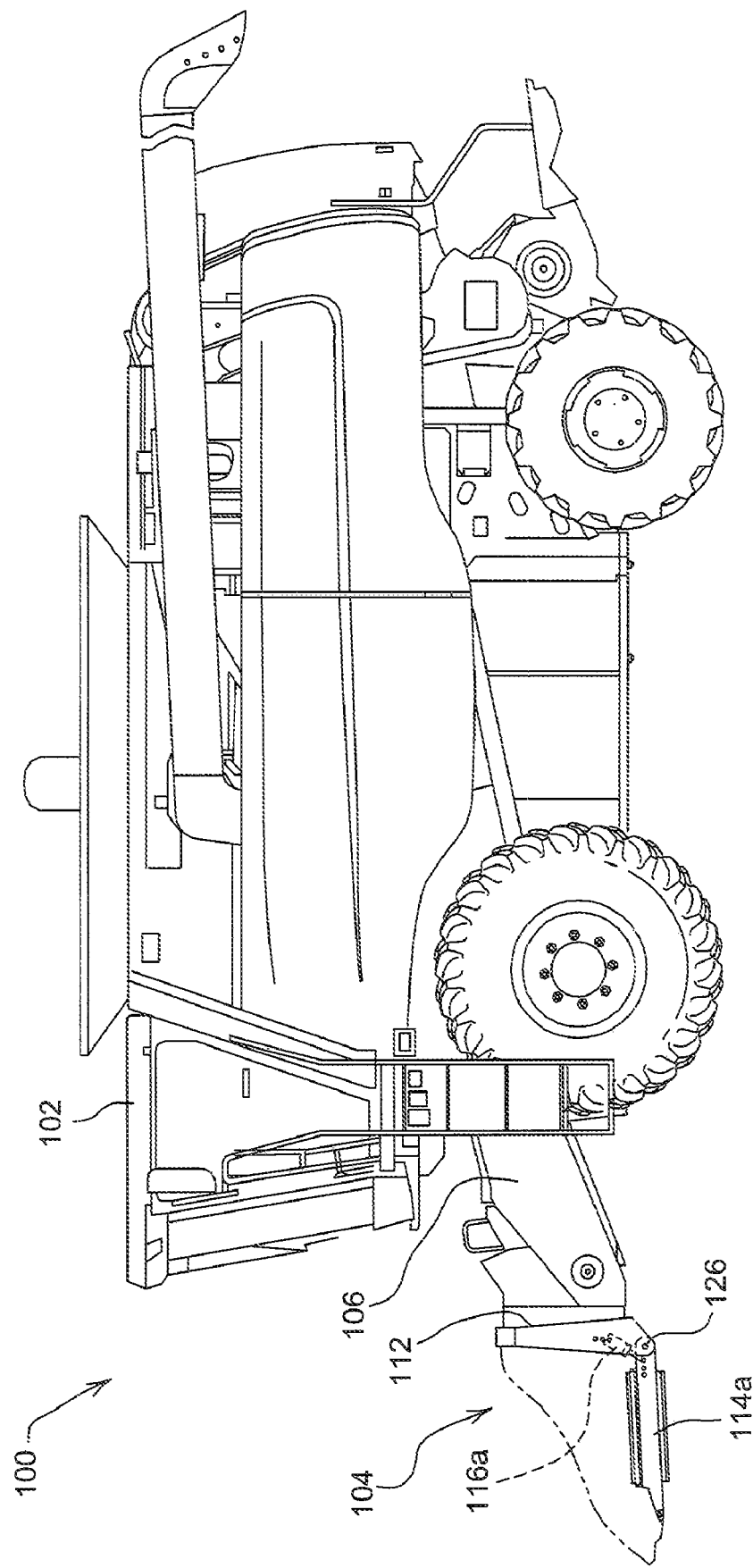
FIG. 2 is a side view of the harvester of FIG. 1.

Referring now to FIGS. 1-2, a combine harvester 100 is illustrated, comprising a vehicle 102 that is wheeled and self-propelled, and also comprising a header 104 which is a Draper platform that is mounted on the front of the vehicle 102.

Vehicle 102 further comprises a feeder house 106 that is pivotally coupled to the front of chassis 108 of vehicle 102. Header 104 is supported on the front of feeder house 106.

Header 104 comprises a frame 112, a plurality of arms 114 (identified collectively as header float arms 114a-j), a plurality of springs 116 (identified as springs 116a-j), conveyor belts 118, 120, a center conveyor 122, and a cutter bar assembly 124 that is fixed to the leading ends of the arms 114.

Figure 3:
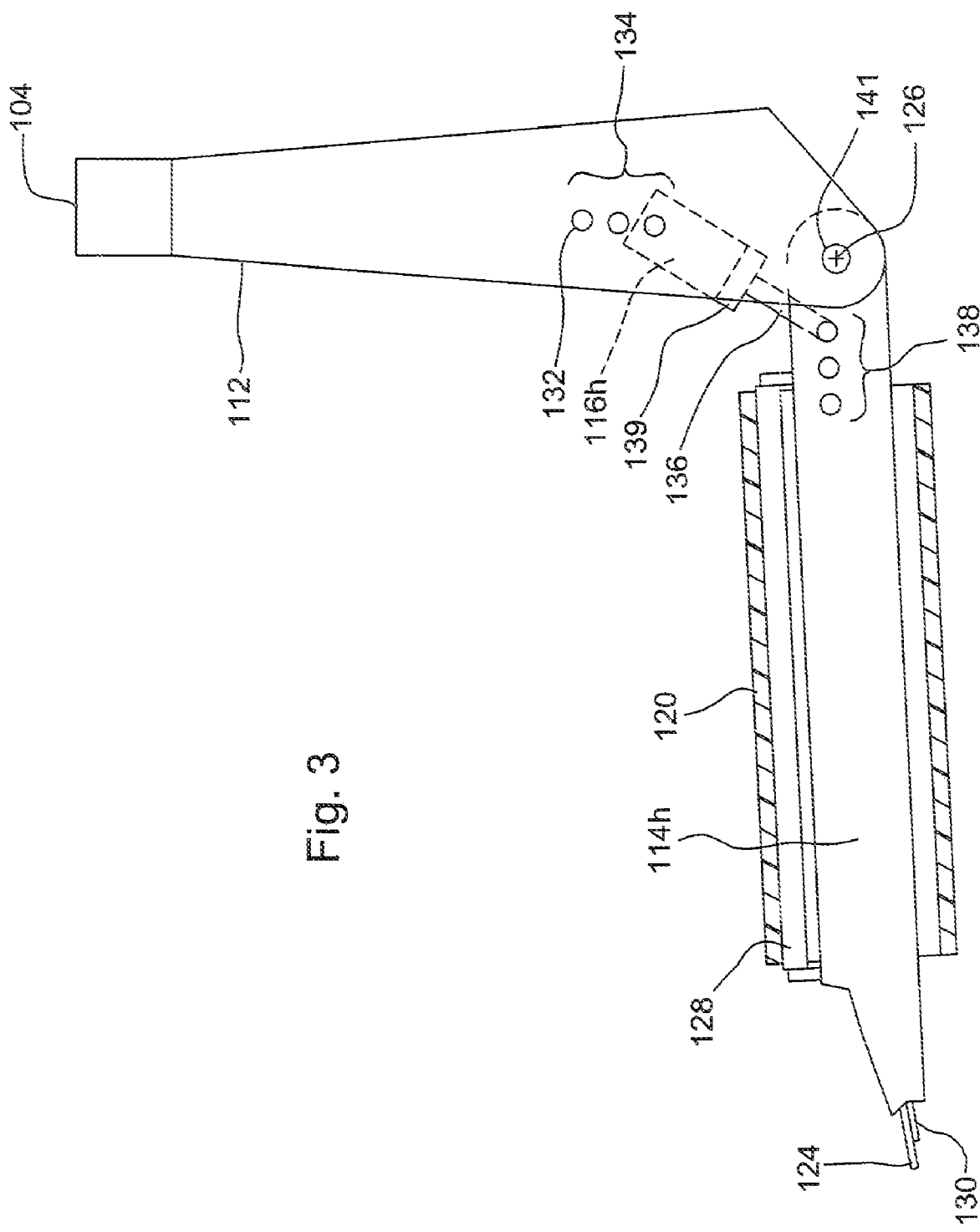
FIG. 3 is a fragmentary cross-sectional view of the header of FIGS. 1-2 taken at section line 2-2 in FIG. 1.

Referring now to FIG. 3, arms 114 extend fore and aft and are pivotally coupled at their rear ends to frame 112. This arrangement permits them to pivot about a substantially horizontal and laterally extending axis 126 with respect to frame 112. This pivotal movement permits the front ends of arms 114 to move up and down with respect to frame 112 as the harvester traverses the ground.

Each arm has an associated spring 116 (identified collectively as springs 116a-j) that is coupled to the arm and to the frame to provide an up will force on its associated arm 114, thereby reducing the force applied by the arm downward on the ground.

Each arm supports a roller 128 that is supported at its front and rear ends on arm 114. Roller 128 is disposed generally parallel to arm 114 and is configured to roll about its longitudinal axis.

Arms 114 located on the left side of the header 104 centerline support a left side conveyor belt 118. Left side conveyor belt 118 is driven such that it carries material falling on its top surface inwards towards the center region of header 104.

Arms 114 located on the right side of the header 104 centerline support a right side conveyor belt 120. Right side conveyor belt 120 is driven such that it carries material falling on its top surface inwards towards the center region of header 104.

Left side conveyor belt 118 and right side conveyor belt 120 are supported on rollers 128.

Cutter bar assembly 124 extends laterally across the width of the header 104 and is fixed to the front ends of arms 114. A lower portion 130 of cutter bar assembly 124 functions as a skid plate, sliding along the ground as vehicle 102 transports header 104 across the field. A portion of the weight of the arms, the conveyor belts, and the crop material riding on the conveyor belts is communicated to cutter bar assembly 124 and thence to the ground. The remainder of the weight is communicated to feeder house 106.

Cutter bar assembly 124 is flexible in the lateral direction to permit individual arms 114a-j to rise and fall somewhat independently of each other as the cutter bar assembly 124 follows the contours of the ground. This permits the header to more closely follow the contours of the ground. In turn, this close ground-following ensures that the header 104 picks up all of the plant material bearing crop.

Each arm 114a-j is provided with a spring 116a-j that is coupled to the arm and to the frame 112 of the header 104. Spring 116 may be mechanical, hydraulic, or pneumatic. It applies an upward force to arm 114a-j, reducing the downforce exerted by arm 114a-j on the ground via cutter bar assembly 124. Springs 116a-j transfer the weight of their associated arms (and the loads they carry) from the ground to frame 112.

The force that each spring 116a-j applies is not the same, however. Springs 116 that are closer to the center of header 104 apply a greater upforce to their associated arms 114a-j than springs 116a-j located farther from the center of header 104. This differential additional upforce applied to arms 114a-j closer to the center of header 104 compensates for the increased weight of crop material on the conveyor belt 118, 120 supported on those arms. The weight of the plant material on the conveyor belts 118, 120 resting on arms 114a-j changes as more and more crop accumulates on the conveyor belts. The weight of the plant material at the outer ends of the conveyor belts is relatively light. As the conveyor belt (supported on rollers 128) moves towards the lateral midpoint of the header 104, more and more plant material is cut by the cutter bar assembly 124 and falls on the conveyor belts. This builds up a thick layer of cut plant material on the conveyor belt that reaches a maximum thickness when the conveyor belt reaches the lateral midpoint of the header 104 and center conveyor 122. At this point, conveyor belts 118, 120 on the left and right sides, respectively, of header 104 deposit their accumulated cut plant material on center conveyor 122, which moves the cut plant material backward, through feeder house 106, and into vehicle 102 for further processing.

In order to maintain a relatively constant downforce across the entire width of the cutter bar assembly 124, each of the arms 114a-j is counterbalanced by its associated spring 116a-j such that each arm 114a-j applies the same downforce on the section of the cutter bar assembly 124 to which it is attached. This provides an even ground load across the width of the header 104.

There are several ways that the springs 116a-j can be configured to provide different upforces to arms 114a-j such as by adjusting their mounting locations on the frame of the header or the arms, or by varying up reload to the springs.

Referring now to FIG. 3, spring 116h has an upper end 132 that can be coupled to frame 112 at several different mounting points 134 and a lower end 136 that can be coupled to arm 114h at several different mounting points 138. Spring 116h has a preload adjuster 139, here shown as an adjustable screw on the barrel of the spring to vary the preload of the spring. By mounting the lower end of spring 116*h* closer to the pivot 141, the ground force at the end of arm 114*h* can be increased. By mounting the lower end of spring 116*h* farther from the pivot, the ground force at the end of arm 114*h* can be decreased. By mounting the upper end of spring 116*h* farther upward, the ground force at the end of arm 114*h* can be decreased. By mounting the upper end of spring 116*h* farther downward, a ground force at the end of arm 114*h* can be increased. By increasing the spring preload on spring 116*h*, the ground force at the end of arm 114*h* can be decreased. By decreasing the spring preload one spring 116*h*, the ground force at the end of arm 114*h* can be increased. The arrangement of spring 116*h* and arm 114*h* in FIG. 3 is typical of all the springs 116*a-j* and arms 114*a-j* in header 104. The springs 116*a-j* are individually adjusted to provide a greater upforce on the arms 114*a-j* that are closer to the lateral midpoint or center of header 104 and to provide a smaller upforce on the arms 114*a-j* farther from the lateral midpoint or center of header 104.

Header 104 of FIGS. 1-3 is divided into several zones, comprising a first zone including the two outer arms 114*a*, 114*b* on the far left side of the header and the two outer arms 114*i*, 114*j* on the far right side of the header. A second zone includes the two arms on each side of the header just inside the first zone, 114*c*, 114*d*, 114*g*, 114*h*, and the third zone including the two center arms 114*e*, 114*f*.

Springs 116*a*, 116*b*, 116*i*, 116*j* of the first zone are configured to provide a first upforce to their associated arms. Springs 116*c*, 116*d*, 116*g*, 116*h* are configured to provide a second upforce to their associated arms 114*c*, 114*d*, 114*g*, 114*h* that is greater than the first upforce applied to the arms in the first zone. This accommodates the additional weight of cut crop matter falling on conveyor belts 118, 120 as the belts move from the first zone to the second zone.

Springs 116*e*, 116*f* are configured to provide a third upforce to their associated arms 114*e*, 114*f* that is greater than the second upforce applied to the arms in the second zone. This accommodates the additional weight of cut crop matter falling on conveyor belts 118, 120 as the belts move from the second zone to the third zone.

In an alternative embodiment, each of the springs 116*a-j* is configured to apply an upforce that is greater than the upforce applied to the arm immediately adjacent to it and farther away from the centerline of the vehicle. In other words, the upforce applied by spring 116*e* to its arm is greater than that applied by spring 116*d* to its arm, which is greater than that applied by spring 116*c* to its arm, which is greater than that applied by spring 116*b* to its arm which is greater than that applied by spring 116*a* to its arm. An upforce applied by spring 116*f* to its arm is greater than the upforce applied by spring 116*g* to its arm, which is greater than the upforce applied by spring 116*h* to its arm, which is greater than the upforce applied by spring 116*i* to its arm, which is greater than the upforce applied by spring 116*j*.

One drawback of this arrangement is the need to mechanically adjust each spring 116*a*-116*j* for different crops and crop conditions. Any particular adjustment of springs 116*a-j* in FIGS. 1-3 anticipates a particular crop load on conveyor belts 118, 120. If the actual crop load is different from this, the ground force exerted by each of arms 114 will not be ideal. Indeed, if a very large crop load is expected on conveyor belts 118, 120, the compensating upforce generated by springs 116*a-j* may be so great that the arms may actually be lifted above the ground if the crop is not as heavy as anticipated and therefore the compensating upforce generated by springs 116*a-j* is too great.

Figure 4:
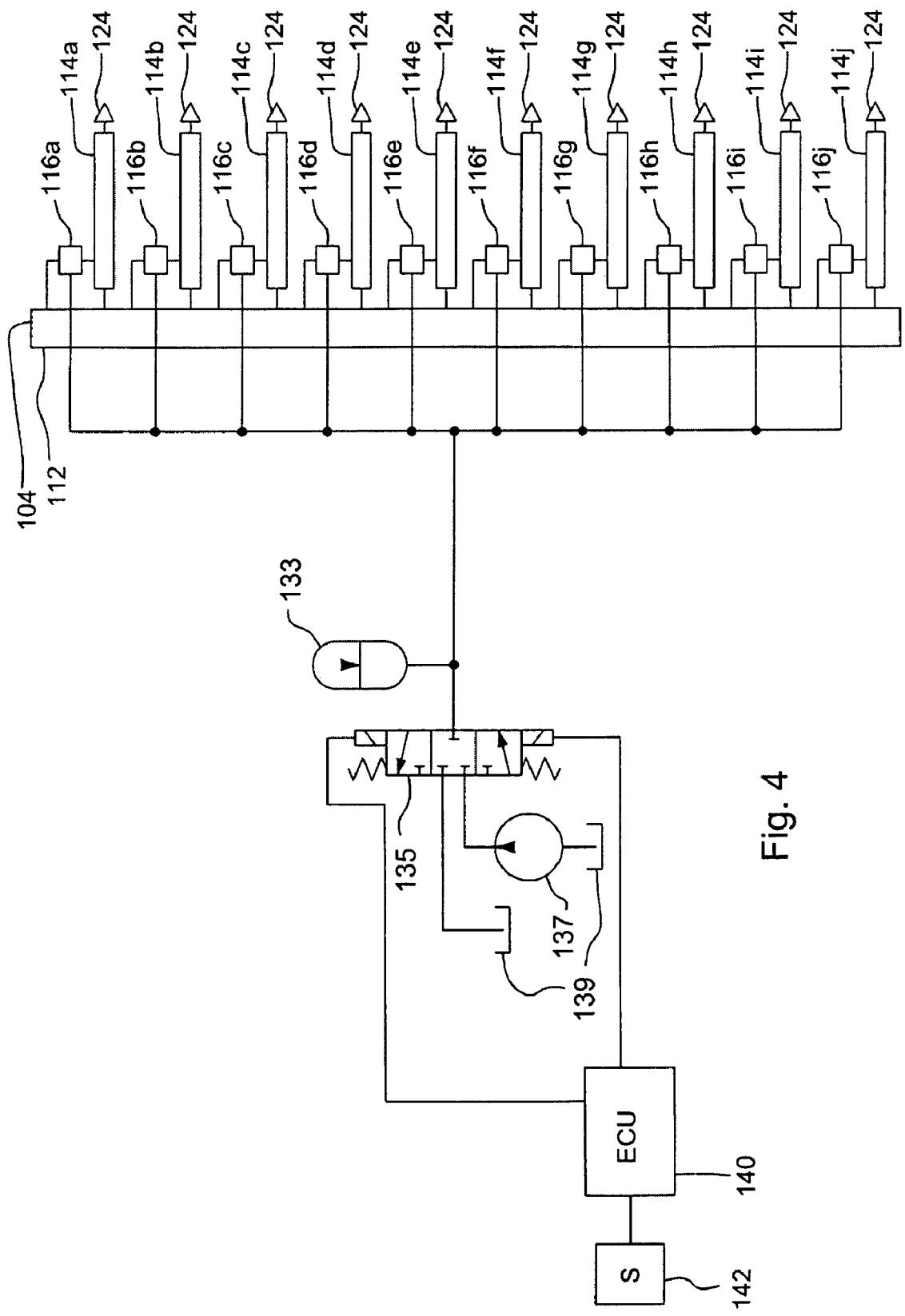
FIG. 4 is a schematic diagram of the header of FIGS. 1-3 with alternative springs and a control circuit for controlling the alternative springs.

To provide easier adjustment of the upforces generated by springs 116*a-j*, other spring arrangements may be employed. In FIG. 4, for example, each of springs 116*a-j* is a hydraulic cylinder. Springs 116*a-j* in FIG. 4 are all coupled to an accumulator that is gas charged and contains hydraulic fluid under pressure. This pressure is applied equally to all of the springs 116*a-j* in FIG. 4. In one arrangement, springs 116*a-j* exert an equal upforce on their associated arms 114*a-j* to counterbalance the weight of the arm 114*a-j* and the weight of the crop material on conveyor belts 118, 120 that the arms support. In an alternative arrangement, springs 116*a-j* in FIG. 4 are configured to exert different upforces on their associated arms 114*a-j* to counterbalance the weight of the arm 114*a-j* and the weight of the crop material on conveyor belts 118, 120 that the arms support. In this alternative arrangement, the upforces exerted by springs 116*a-j* on arms 114*a-j* may be divided into multiple zones, such as the three zones described above with regard to the header 104 of FIGS. 1-3. Alternatively the upforces exerted by springs 116*a-j* on arms 114*a-j* may be arranged such that the upforce generated by spring 116*e* is greater than the force generated by spring 116*d*, which is greater than the force generated by spring 116*c*, which is greater than the force generated by spring 116*b*, which is greater than the force generated by spring 116*a*. The upforce generated by spring 116*f* is greater than the upforce generated by spring 116*g*, which is greater than the upforce generated by spring 116*h*, which is greater than the upforce generated by spring 116*i* to its arm, which is greater than the upforce generated by spring 116*j* to its arm.

In order to generate different upforces when the hydraulic fluid pressure applied to each of the springs 116*a-j* is the same, springs 116*a-j* may be made with different piston diameters, or alternatively may be coupled to arms 114*a-j* and frame 112 of header 104 at different locations with different mechanical advantages, such as at the different locations along the arms and the frame shown in FIG. 3.

In the arrangement of FIG. 4, the amount of upforce generated by all of the springs 116*a-j* can be varied simultaneously by filling or emptying the accumulator 133. A valve 135 is provided that is coupled to a hydraulic fluid supply 137 and a hydraulic fluid reservoir 139. The valve 135, when opened, can selectively empty hydraulic fluid from the accumulator 133 to the hydraulic fluid reservoir 139, or fill the accumulator 133 with hydraulic fluid from the hydraulic fluid supply 137. As the accumulator 133 is emptied, the pressure in the accumulator 133, and hence the pressure in each of springs 116*a-j* decreases. As the accumulator 133 is filled, the pressure in the accumulator 133 and hence the pressure in each of springs 116*a-j* increases. The change in pressure in springs 116*a-j* causes a proportional change in the upforce applied by the springs to arms 114*a-j*. Thus, by changing the fluid in the accumulator 133, all of the compensating upforces applied to arms 114*a-j* are simultaneously and proportionally changed across the width of header 104.

Electronic control unit (ECU) 140 is coupled to the valve 135 to selectively fill or empty the accumulator 133 under computer control. Electronic control unit 140 is preferably a microprocessor based digital computer including the memory circuit containing a program configured to perform all functions of the electronic control unit described herein. A sensor 142 is coupled to the electronic control unit 140 to transmit to the electronic control unit 140 a value indicative of a desired compensating upforce to be generated by springs 116*a-j*. In one embodiment, the sensor 142 is a rotor load sensor, responsive to and indicative of the load on a threshing rotor in the vehicle 102 (not shown). In another embodiment, the sensor is a strain gauge coupled to a rotor drive element such as a rotor shaft or gear responsive to and indicative of the load on the rotor. In another embodiment, the sensor is a pressure sensor responsive to and in indicative of the hydraulic pressure in the hydraulic circuit driving the rotor. In another embodiment, the sensor is a pressure sensor responsive to and indicative of the hydraulic pressure in the hydraulic circuit that drives conveyor belts 118, 120. In another embodiment, the sensor is a load sensor responsive to and indicative of the weight of conveyor belts 118, 120. In any of these embodiments, the sensed parameter is indicative of the load on the harvester, and hence the volume of crop material being harvested. The volume of crop material being harvested is indicative of the weight of the crop material. The weight of the crop material is indicative of the downforce exerted by arms 114*a-j* and thus is indicative of the desired compensating upforce each spring 116*a-j* needs to apply to its associated arm 114*a-j* to maintain the downforce exerted by arms 114*a-j* on the cutter bar (and hence the force the cutter bar and arms exert on the ground). The electronic control unit 140 is configured to monitor the sensor and to open the valve an amount appropriate to maintain constant the downforce exerted by arms 114*a-j* on the cutter bar (and hence the force the cutter bar and arms exert on the ground).

In another embodiment, the sensor 142 is configured to sense the position of an operator input device, for example a joystick, knob, dial, or lever, that the operator uses to directly command a desired compensating upforce. In this arrangement, the operator monitors the crop load and selects the desired upforce to be generated by springs 116*a-j*. Once the operator has selected the desired upforce, he adjusts the operator input device to indicate the desired upforce. The sensor 142 is responsive to this change in the operator input device and signals the electronic control unit. The electronic control unit 140, in turn, is programmed to open or close the valve 135 as necessary to generate the desired upforce. In this manner, and even while the vehicle is underway, the operator can simultaneously adjust the desired upforce of all the springs 116*-j*.

Figure 5:
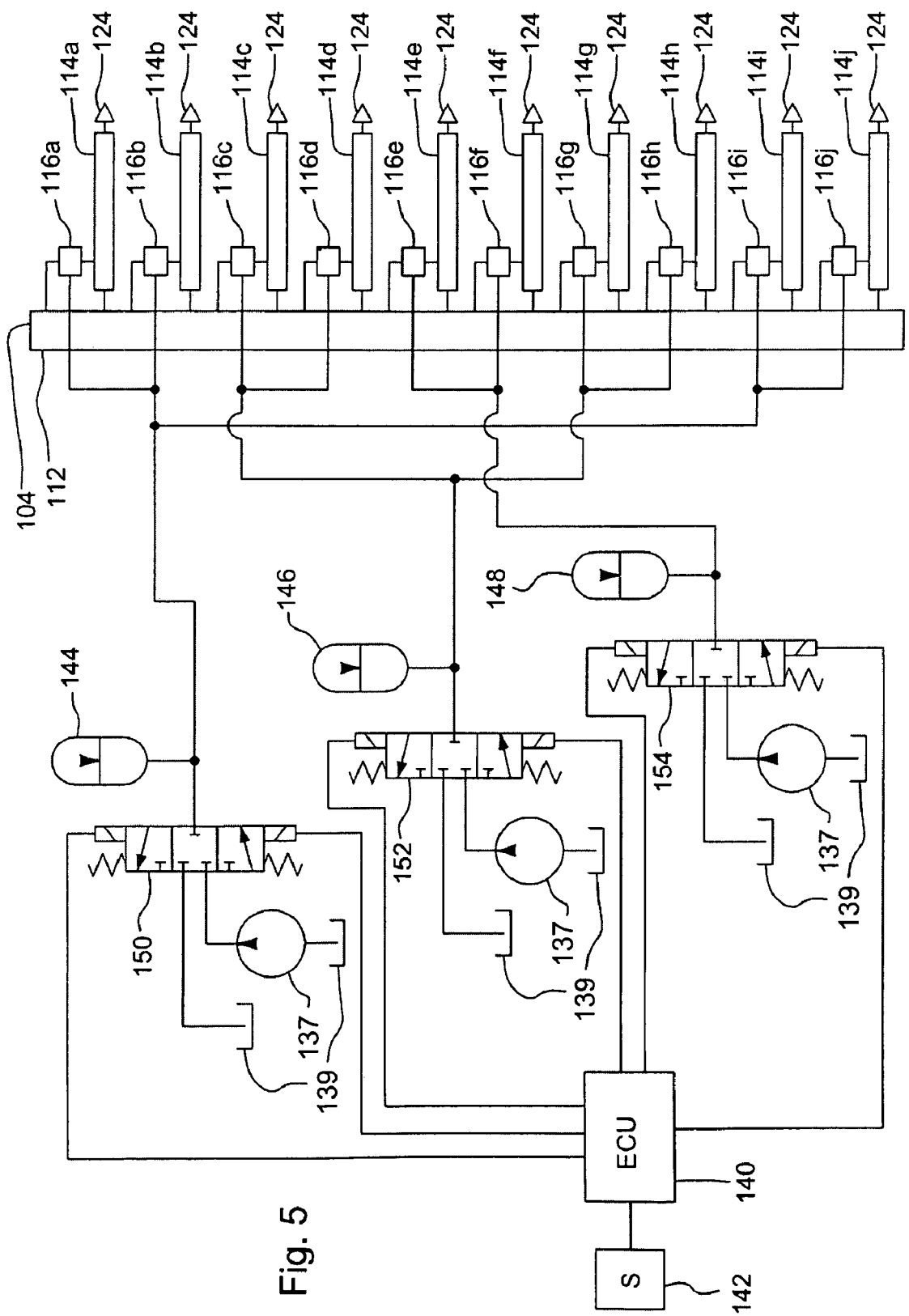
FIG. 5 is a schematic diagram of the header of FIG. 4 with an alternative control circuit for controlling the alternative springs.

FIG. 5 illustrates another embodiment of the system in which a different control circuit is provided to control the operation of springs 116*a-j*, the control circuit including three accumulators 144, 146, 148 to apply a different hydraulic pressure to three different groups of springs 116*a-j*. This embodiment is the same as the embodiment of FIG. 4 in all respects, except the control circuit includes three valves and three accumulators to apply three different pressures to three different groups of valves 116*a-j*. In the embodiment of FIG. 5, the control circuit includes a first accumulator 144 containing gas charged hydraulic fluid that is coupled to springs 116*a*, 116*b*, 116*i*, and 116*j*. A second accumulator 146 containing gas charged hydraulic fluid is coupled to springs 116*c*, 116*d*, 116*g*, and 116*h*. A third accumulator 148 containing gas charged hydraulic fluid is coupled to springs 116*e* and 116*f*. These three groups of springs 116*a-j* define three different zones of the header 104. These three accumulators are coupled to a first valve 150, a second valve 152, and a third valve 154, respectively that conduct hydraulic fluid to and from their respective accumulators 144, 146, 148. Each of the three valves 144, 146, 148 are also coupled to the hydraulic fluid supply 137 and the hydraulic fluid reservoir 139. As in the example of FIG. 4, the electronic control unit 140 opens and closes the valves responsive to the signal provided by the sensor 142 in order to maintain constant a desired downforce exerted by arms 114*a-j* and the cutter bar on the ground. In the embodiment of FIG. 5, however, the electronic control unit 140 is separately coupled to each of the three valves 150, 152, 154 such that it can change the hydraulic pressure in each of the three zones independently of the hydraulic pressure in the other zones.

Having described the preferred embodiment, it will become apparent that various modifications can be made without departing from the scope of the invention as defined in the accompanying claims.

The invention claimed is:

1. A float arm load compensation system for a header of an agricultural harvester, comprising:
   a header frame;
   a plurality of header float arms pivotally coupled to the header frame;
   a cutter bar fixed to forward ends of the plurality of header float arms;
   at least one conveyor belt supported on the plurality of header float arms and configured to traverse the header perpendicular to the direction of travel of the header, wherein the conveyor belt is further configured to receive crop material cut by the cutter bar;
   a plurality of springs, wherein each spring is coupled to an associated header float arm of the plurality of header float arms to exert a force on the associated header float arm compensating for the weight of cut crop material supported by the associated header float arm; and
   a control circuit configured to monitor an operational parameter of the agricultural harvester indicative of the load on the at least one conveyor belt.

2. The load compensation system of claim 1, wherein springs of the plurality of springs that support float arms closer to the lateral midpoint of the header are configured to exert a greater upforce on their associated header float arms than other springs of the plurality of springs that support float arms farther from the lateral midpoint of the header.

3. The load compensation system of claim 1, wherein the plurality of springs are configured to maintain constant the downforce exerted by their associated header float arms against the ground across a width of the header.

4. The load compensation system of claim 1, wherein the control circuit monitors an operational parameter indicative of a load on the rotor of the harvester.

5. The load compensation system of claim 1, wherein the control circuit is configured to automatically change the forces exerted by the plurality of springs on their associated header float arms in response to changes in the operational parameter.

6. The load compensation system of claim 1, further comprising an accumulator containing gas charged hydraulic fluid coupled to the plurality of springs.

7. The load compensation system of claim 1, further comprising a valve configured to simultaneously change the force is applied by the plurality of springs by filling and emptying the accumulator.

8. The load compensation system of claim 1, wherein the plurality of springs are mechanical springs.

9. The load compensation system of claim 8, wherein the mechanical springs are coil springs.

10. A float arm load compensation system for a header of an agricultural harvester, comprising:
    a header frame;
    a plurality of header float arms pivotally coupled to the header frame;
    a cutter bar fixed to forward ends of the plurality of header float arms;

at least one conveyor belt supported on the plurality of header float arms and configured to traverse the header perpendicular to the direction of travel of the header, wherein the conveyor belt is further configured to receive crop material cut by the cutter bar;

a plurality of springs, wherein each spring is coupled to an associated header float arm of the plurality of header float arms to exert a force on the associated header float arm compensating for the weight of cut crop material supported by the associated header float arm; and at least first and second accumulators containing hydraulic fluid under pressure, wherein the first accumulator is coupled to a first group of springs of the plurality of springs, and wherein the second accumulator is coupled to a second group of springs of the plurality of springs.

11. The load compensation system of claim 10, wherein springs of the plurality of springs that support float arms closer to the lateral midpoint of the header are configured to exert a greater upforce on their associated header float arms than other springs of the plurality of springs that support float arms farther from the lateral midpoint of the header.

12. The load compensation system of claim 10, wherein the plurality of springs are configured to maintain constant the downforce exerted by their associated header float arms against the ground across a width of the header.

13. The load compensation system of claim 10, further comprising a control circuit configured to monitor an operational parameter of the agricultural harvester indicative of the load on the at least one conveyor belt.

14. The load compensation system of claim 13, wherein the control circuit monitors an operational parameter indicative of a load on the rotor of the harvester.

15. The load compensation system of claim 13, wherein the control circuit is configured to automatically change the forces exerted by the plurality of springs on their associated header float arms in response to changes in the operational parameter.

16. The load compensation system of claim 10, further comprising an accumulator containing gas charged hydraulic fluid coupled to the plurality of springs.

17. The load compensation system of claim 10, further comprising a valve configured to simultaneously change the force is applied by the plurality of springs by filling and emptying the accumulator.

18. The load compensation system of claim 10, wherein the plurality of springs are mechanical springs.

19. The load compensation system of claim 18, wherein the mechanical springs are coil springs.

* * * * *